United States Patent
Yamada

(10) Patent No.: US 9,020,731 B2
(45) Date of Patent: Apr. 28, 2015

(54) CONTROL APPARATUS FOR ELECTRIC MOTOR, ELECTRICALLY-POWERED VEHICLE INCLUDING THE CONTROL APPARATUS, AND METHOD FOR CONTROLLING ELECTRIC MOTOR

(75) Inventor: Kenji Yamada, Komaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/008,117

(22) PCT Filed: Apr. 5, 2011

(86) PCT No.: PCT/JP2011/058598
§ 371 (c)(1),
(2), (4) Date: Sep. 27, 2013

(87) PCT Pub. No.: WO2012/137300
PCT Pub. Date: Oct. 11, 2012

(65) Prior Publication Data
US 2014/0018991 A1    Jan. 16, 2014

(51) Int. Cl.
*B60L 15/20* (2006.01)
*B60L 15/02* (2006.01)
*H02P 27/08* (2006.01)
*H02P 21/00* (2006.01)
*H02P 6/08* (2006.01)

(52) U.S. Cl.
CPC .............. *B60L 15/20* (2013.01); *B60L 15/025* (2013.01); *H02P 27/085* (2013.01); *H02P 21/0003* (2013.01); *H02P 6/08* (2013.01); *B60L 2240/423* (2013.01); *B60L 2240/427* (2013.01); *B60L 2260/40* (2013.01); *Y02T 10/643* (2013.01)

(58) Field of Classification Search
None
See application file for complete search history.

(56) References Cited

U.S. PATENT DOCUMENTS

| | | | |
|---|---|---|---|
| 6,515,446 B1* | 2/2003 | Koide et al. | 318/700 |
| 2006/0192519 A1 | 8/2006 | Nakakita et al. | |
| 2006/0237244 A1 | 10/2006 | Hommi | |
| 2008/0218111 A1* | 9/2008 | Okamura | 318/453 |
| 2011/0031911 A1* | 2/2011 | Marcinkiewicz et al. | 318/400.3 |
| 2011/0241584 A1* | 10/2011 | He et al. | 318/400.09 |
| 2011/0248663 A1* | 10/2011 | Yamakawa et al. | 318/805 |
| 2012/0249046 A1* | 10/2012 | Soares et al. | 318/811 |
| 2013/0187583 A1* | 7/2013 | Iwatsuki et al. | 318/400.17 |

FOREIGN PATENT DOCUMENTS

| | | |
|---|---|---|
| CN | 101288222 A | 10/2008 |
| JP | H-09-312978 | 12/1997 |
| JP | A-2000-050689 | 2/2000 |
| JP | A-2005/045880 | 2/2005 |
| JP | A-2005-051850 | 2/2005 |
| JP | A-2006-232492 | 9/2006 |
| JP | A-2008-167557 | 7/2008 |

* cited by examiner

*Primary Examiner* — John R Olszewski
*Assistant Examiner* — Jeffrey Boomer
(74) *Attorney, Agent, or Firm* — Oliff PLC

(57) ABSTRACT

A PI calculation unit of a rectangular-wave voltage control unit calculates a control deviation by performing a PI calculation on a torque deviation relative to a torque command value, and outputs a voltage phase of a rectangular-wave voltage in accordance with the control deviation. A rate-of-change limiter imposes a restriction on the rate of change of the voltage phase. Here, the rate-of-change limiter lessens the restriction on the rate of change of the voltage phase, when the rate of change of the rotational speed of an electric motor is larger than a predetermined value representing an abrupt change of the rotational speed of the electric motor.

18 Claims, 10 Drawing Sheets

FIG.2

| CONTROL SCHEME | PWM CONTROL MODE | | RECTANGULAR-WAVE VOLTAGE CONTROL MODE |
|---|---|---|---|
| | SINE WAVE PWM | OVERMODULATION PWM | RECTANGULAR WAVE (ONE PULSE) |
| WAVEFORM OF INVERTER'S OUTPUT VOLTAGE | FUNDAMENTAL COMPONENT | FUNDAMENTAL COMPONENT | FUNDAMENTAL COMPONENT |
| MODULATION RATIO | 0 TO ABOUT 0.61 | MAX BY SINE WAVE PWM TO 0.78 | 0.78 |
| CHARACTERISTICS | SMALL TORQUE VARIATION | IMPROVED OUTPUT FOR MIDDLE SPEED RANGE | IMPROVED OUTPUT FOR HIGH SPEED RANGE |

FIG.3

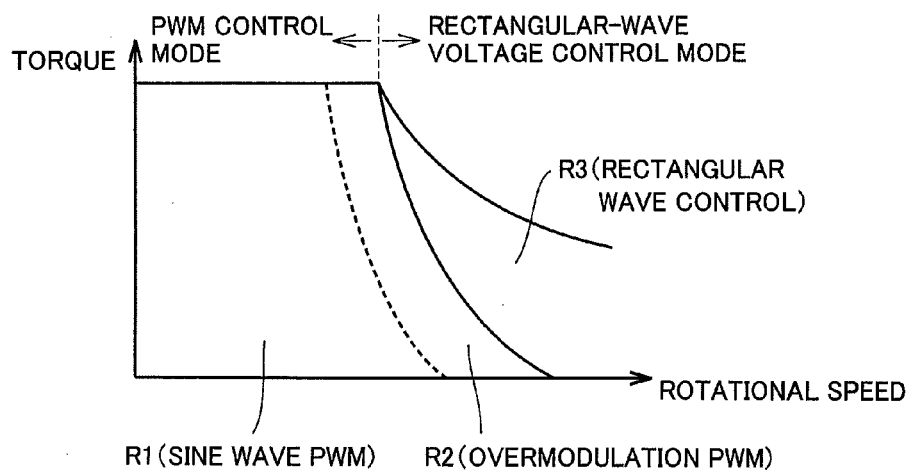

CONTROL APPARATUS FOR ELECTRIC MOTOR, ELECTRICALLY-POWERED VEHICLE INCLUDING THE CONTROL APPARATUS, AND METHOD FOR CONTROLLING ELECTRIC MOTOR

TECHNICAL FIELD

The present invention relates to a control apparatus for an electric motor and an electrically-powered vehicle including the control apparatus, as well as a method for controlling an electric motor. In particular, the invention relates to a technique for rectangular-wave voltage control that controls an electric motor by applying to the electric motor a rectangular-wave voltage which is phase-controlled in accordance with a torque command.

BACKGROUND ART

Environmentally-friendly vehicles, particularly electrically-powered vehicles such as electric vehicle and hybrid vehicle have recently been of interest. The electric vehicle is mounted with a power storage device, an inverter, and an electric motor driven by the inverter that serve as sources of motive power for the vehicle to travel. The hybrid vehicle is mounted with a power storage device, an inverter, and an electric motor in addition to an internal combustion engine that serve as sources of motive power for the vehicle to travel.

Regarding such electrically-powered vehicles, Japanese Patent Laying-Open No. 2005-51850 (PTD 1) discloses that, in response to detection of skid of a drive wheel driven by an electric motor, the electric motor is controlled so that the torque to be output to the drive shaft is restricted (see PTD 1).

As for control of an electric motor, PWM control is well known under which a pulse-width-modulated (PWM) voltage is applied to the electric motor. Control is also known under which the voltage utilization factor can be increased to a greater extent than the PWM control, specifically rectangular-wave voltage control is known under which a rectangular-wave voltage which is phase-controlled in accordance with a torque command (torque's target value) is applied to the electric motor.

Japanese Patent Laying-Open No. 2000-50689 (PTD 2) discloses, regarding the rectangular-wave voltage control of an electric motor, that the voltage phase of the rectangular-wave voltage is controlled based on a deviation of a detected value of the torque of the electric motor from a torque command value (see PTD 2)

CITATION LIST

Patent Document

PTD 1: Japanese Patent Laying-Open No. 2005-51850
PTD 2: Japanese Patent Laying-Open No. 2000-50689
PTD 3: Japanese Patent Laying-Open No. 2008-167557

SUMMARY OF INVENTION

Technical Problem

For control of an electric motor, it is important that the control is performed stably and that an actual output torque follows a torque command (torque responsiveness). The technique disclosed in above-referenced Japanese Patent Laying-Open No. 2005-51850 restricts the torque when skid occurs, to thereby protect the electric motor. The technique, however, does not give particular consideration to the controllability (stability and responsiveness) of the electric motor. The technique disclosed in Japanese Patent Laying-Open No. 2000-50689 reduces the torque deviation for the rectangular-wave voltage control. The technique, however, does not give particular consideration to the controllability of the electric motor against sharp changes of the rotational speed and the torque that may arise when skid occurs or grip occurs after the skid.

An object of the present invention is therefore to provide a control apparatus for an electric motor that can achieve both the control stability and the torque responsiveness for rectangular-wave voltage control for the electric motor, and to provide an electrically-powered vehicle including the control apparatus.

Another object of the present invention is to provide a method for controlling an electric motor by which both the control stability and the torque responsiveness can be achieved for the rectangular-wave voltage control for the electric motor.

Solution to Problem

According to the present invention, a control apparatus for an electric motor includes a voltage command generation unit and a rate-of-change restriction unit. The voltage command generation unit generates a rectangular-wave voltage command that is phase-controlled in accordance with a torque command to cause the electric motor to operate. The rate-of-change restriction unit imposes a restriction on a rate of change of the rectangular-wave voltage command. The rate-of-change restriction unit lessens the restriction on the rate of change of the rectangular-wave voltage command, when a rate of change of a rotational speed of the electric motor is larger than a predetermined value representing an abrupt change of the rotational speed of the electric motor.

Preferably, when the change of the rotational speed of the electric motor causes the rotational speed to increase, the rate-of-change restriction unit lessens the restriction on only advance phase shift of the rectangular-wave voltage command. When the change of the rotational speed of the electric motor causes the rotational speed to decrease, the rate-of-change restriction unit lessens the restriction on only retard phase shift of the rectangular-wave voltage command.

Preferably, the rate-of-change restriction unit further lessens the restriction on the rate of change of the rectangular-wave voltage command, when a rate of change of the torque command is larger than another predetermined value representing an abrupt change of the torque command.

According to the present invention, an electrically-powered vehicle includes: a control apparatus for an electric motor as described above; the electric motor controlled by the control apparatus; and a drive wheel driven by the electric motor.

Preferably, when skid of the drive wheel or grip of the drive wheel after the skid is detected, the rate-of-change restriction unit of the control apparatus lessens the restriction on the rate of change of the rectangular-wave voltage command.

More preferably, when the skid is detected, the rate-of-change restriction unit lessens the restriction on only advance phase shift of the rectangular-wave voltage command and, when the grip is detected, the rate-of-change restriction unit lessens the restriction on only retard phase shift of the rectangular-wave voltage command.

Preferably, the rate-of-change restriction unit further lessens the restriction on the rate of change of the rectangular-wave voltage command, when a rate of change of the torque command is larger than another predetermined value representing an abrupt change of the torque command.

According to the present invention, a method for controlling an electric motor includes the steps of: generating a rectangular-wave voltage command that is phase-controlled in accordance with a torque command to cause the electric motor to operate; imposing a restriction on a rate of change of the rectangular-wave voltage command;

and lessening the restriction on the rate of change of the rectangular-wave voltage command, when a rate of change of a rotational speed of the electric motor is larger than a predetermined value representing an abrupt change of the rotational speed of the electric motor.

Preferably, the step of lessening the restriction on the rate of change includes the steps of: lessening the restriction on only advance phase shift of the rectangular-wave voltage command when the change of the rotational speed of the electric motor causes the rotational speed to increase; and lessening the restriction on only retard phase shift of the rectangular-wave voltage command when the change of the rotational speed of the electric motor causes the rotational speed to decrease.

Preferably, the step of lessening the restriction on the rate of change includes the step of lessening the restriction on the rate of change of the rectangular-wave voltage command, when a rate of change of the torque command is larger than another predetermined value representing an abrupt change of the torque command.

Advantageous Effects of Invention

According to the present invention, a restriction is imposed on the rate of change of the rectangular-wave voltage command. Thus, under the rectangular-wave voltage control, offset of the motor current is suppressed that occurs as the phase of the voltage command is changed in response to a change of the rotational speed of the electric motor, and the stability of the electric motor control is enhanced. In contrast, when the rate of change of the rotational speed of the electric motor is larger than a predetermined value representing an abrupt change of the rotational speed of the electric motor, the restriction on the rate of change of the rectangular-wave voltage command is lessened. Accordingly, when an abrupt change occurs to the rotational speed of the electric motor, priority is given to the capability of following the torque command, and the responsiveness of the electric motor control is enhanced.

Thus, in accordance with the present invention, both the control stability and the torque responsiveness can be achieved for the rectangular-wave voltage control for an electric motor.

BRIEF DESCRIPTION OF DRAWINGS

FIG. 2 is a diagram illustrating control modes for the electric motor shown in FIG. 1.

FIG. 3 is a diagram illustrating a relationship between the operating state of an AC (alternating current) electric motor and the control modes shown in FIG. 2.

DESCRIPTION OF EMBODIMENTS

Figure 1:
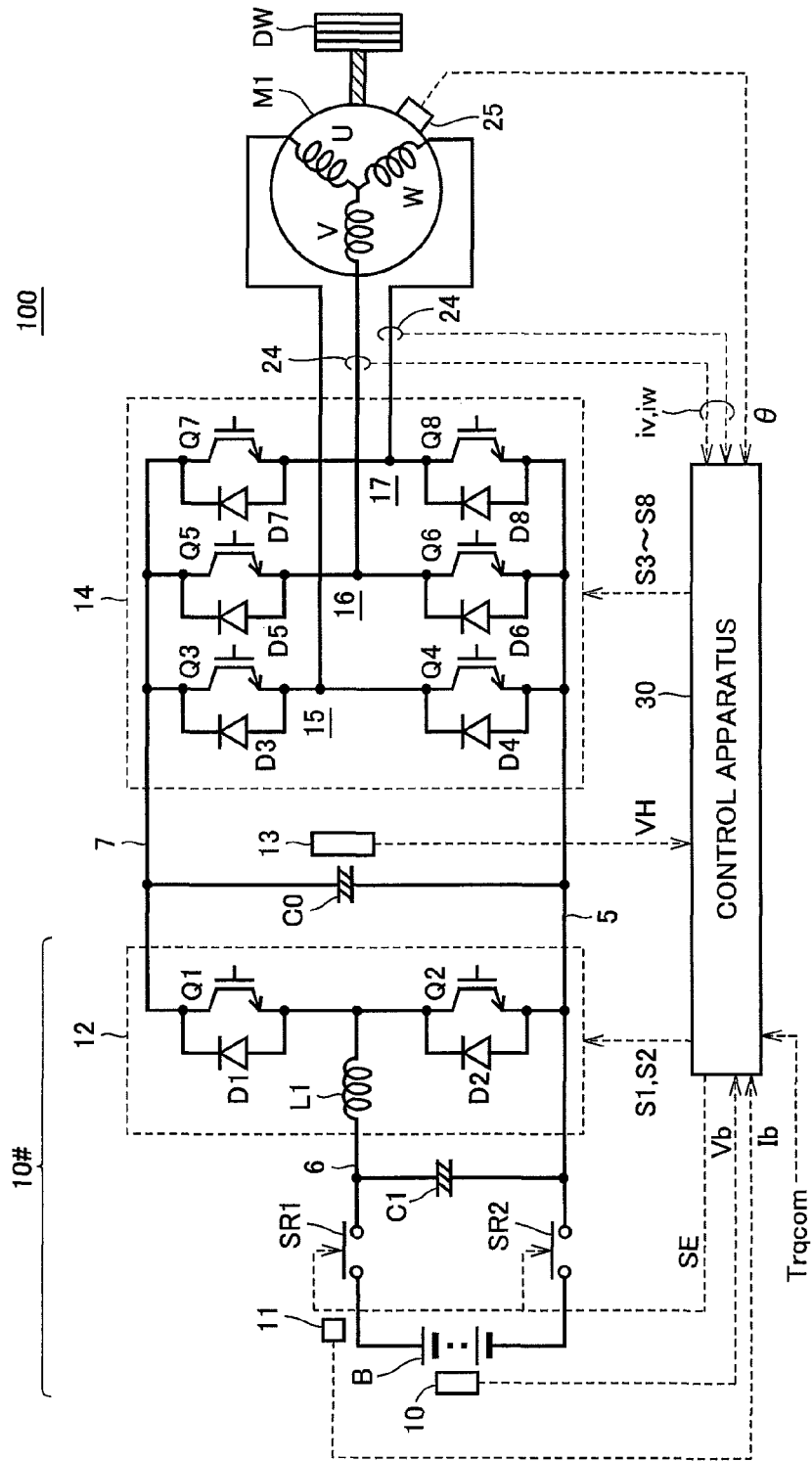
FIG. 1 is an overall configuration diagram of an electrically-powered vehicle to which applied a control apparatus for an electric motor according to a first embodiment of the present invention.

In the following, embodiments of the present invention will be described in detail with reference to the drawings. In the drawings, the same or corresponding components are denoted by the same reference characters, and a description thereof will not be repeated.

[First Embodiment]

FIG. 1 is an overall configuration diagram of an electrically-powered vehicle to which applied a control apparatus for an electric motor according to a first embodiment of the present invention. Referring to FIG. 1, electrically-powered vehicle 100 includes a DC (direct current) voltage generation unit 10#, a smoothing capacitor C0, an inverter 14, an electric motor M1, a drive wheel DW, and a control apparatus 30.

DC voltage generation unit 10# includes a power storage device B, system relays SR1, SR2, a smoothing capacitor C1, and a converter 12. Power storage device B is typically configured in the form of a secondary battery such as nickel-metal hydride or lithium ion secondary battery, an electric double-layer capacitor, or the like. Voltage Vb of power storage device B and current Ib that is input to and output from power storage device B are detected respectively by a voltage sensor 10 and a current sensor 11. System relay SR1 is connected between a positive terminal of power storage device B and an electric power line 6, and system relay SR2 is connected between a negative terminal of power storage device B and an electric power line 5. System relays SR1, SR2 are turned ON/OFF by signal SE from control apparatus 30.

Converter 12 includes a reactor L1, power semiconductor switching elements Q1, Q2, and diodes D1, D2. Power semiconductor switching elements Q1, Q2 are connected in series between an electric power line 7 and electric power line 5. ON/OFF of power semiconductor switching elements Q1, Q2 is controlled by control signals S1, S2 from control apparatus 30.

As the power semiconductor switching elements (hereinafter simply referred to as "switching elements"), an IGBT (Insulated Gate Bipolar Transistor), power MOS (Metal Oxide Semiconductor) transistor, power bipolar transistor, or the like may be used. Diodes D1, D2 are connected in anti-parallel with switching elements Q1, Q2, respectively. Reactor L1 is connected between a node connecting switching elements Q1 and Q2 and electric power line 6. Smoothing capacitor C0 is connected between electric power line 7 and electric power line 5.

Inverter 14 includes a U phase upper-lower arm 15, a V phase upper-lower arm 16, and a W phase upper-lower arm 17 provided in parallel between electric power line 7 and electric power line 5. The upper-lower arm of each phase is constituted of switching elements connected in series between electric power line 7 and electric power line 5. For example, U phase upper-lower arm 15 is constituted of switching elements Q3, Q4, V phase upper-lower arm 16 is constituted of switching elements Q5, Q6, and W phase upper-lower arm 17 is constituted of switching elements Q7, Q8. To switching elements Q3 to Q8, diodes D3 to D8 are connected in antiparallel, respectively. ON/OFF of switching elements Q3 to Q8 is controlled by control signals S3 to S8 from control apparatus 30.

Electric motor M1 is typically a permanent-magnet-type three-phase AC synchronous electric motor and configured to have three coils of the U, V, and W phases having respective ends connected commonly to a neutral point. Respective other ends of the phase coils are each connected to the intermediate point between the switching elements of a corresponding one of U, V, and W phase upper-lower arms 15 to 17. Electric motor Ml is driven by inverter 14 to generate a torque for driving drive wheel DW. Electric motor Ml may also be configured to additionally function as an electric generator which is driven by drive wheel DW when the vehicle is braked, for example.

Converter 12 is basically controlled so that switching elements Q1, Q2 are turned ON/OFF complementarily and alternately in each switching period. When converter 12 performs a voltage step-up operation, converter 12 steps up voltage Vb supplied from power storage device B to voltage VH (this is a DC voltage corresponding to an input voltage to inverter 14, and will also be referred to as "system voltage" hereinafter). This voltage step-up operation is carried out by supplying electromagnetic energy, which is accumulated on reactor L1 in an ON period of switching element Q2, to electric power line 7 via switching element Q1 and diode D1.

When converter 12 performs a voltage step-down operation, converter 12 steps down voltage VH to voltage Vb. This voltage step-down operation is performed by supplying electromagnetic energy, which is accumulated on reactor L1 in an ON period of switching element Q1, to electric power line 6 via switching element Q2 and diode D2. The voltage conversion ratio (ratio between VH and Vb) for this voltage step-up or voltage step-down operation is controlled by the ON period ratio (duty ratio) of switching elements Q1, Q2 to the aforementioned switching period. Switching elements Q1 and Q2 can also be fixed in the ON state and the OFF state respectively so that the relation VH=Vb (voltage conversion ratio=1.0) is obtained.

Smoothing capacitor C0 smoothes a DC voltage from converter 12 and supplies the smoothed DC voltage to inverter 14. A voltage sensor 13 detects the voltage across smoothing capacitor C0, namely system voltage VH, and outputs the value of the detected voltage to control apparatus 30.

When a torque command value (torque's target value) Trqcom for electric motor M1 is positive, inverter 14 uses switching operations of switching elements Q3 to Q8 in response to control signals S3 to S8 from control apparatus 30 so as to convert a DC voltage to an AC voltage, and drives electric motor Ml so that a positive torque is output therefrom. When torque command value Trqcom for electric motor M1 is zero, inverter 14 uses switching operations in response to control signals S3 to S8 so as to convert a DC voltage to an AC voltage, and drives electric motor M1 so that the torque becomes zero. Thus, electric motor M1 is driven to generate a zero or positive torque specified by torque command value Trqcom.

When the vehicle is braked, torque command value Trqcom for electric motor M1 is set negative. In this case, inverter 14 uses switching operations in response to control signals S3 to S8 so as to convert an AC voltage generated by electric motor M1 to a DC voltage, and supplies to converter 12 the DC voltage to which the AC voltage has been converted. Regenerative braking herein includes braking which is accompanied by regenerative power generation when a driver who is driving the vehicle applies the foot brake, as well as deceleration. (or stoppage of acceleration) of the vehicle while regeneratively generating electric power by releasing the accelerator pedal when the vehicle is traveling, without applying the foot brake.

A current sensor 24 detects motor current flowing in electric motor M1 and outputs the value of the detected motor current to control apparatus 30. Since the sum of respective instantaneous values of three-phase currents iu, iv, and iw is zero, current sensor 24 may at least be arranged to detect motor currents of two phases (for example, V phase current iv and W phase current iw).

A rotational angle sensor (resolver) 25 detects rotational angle θ of the rotor of electric motor M1, and outputs the value of the detected rotational angle to control apparatus 30. Based on rotational angle θ, control apparatus 30 can calculate the rotational speed (the number of revolutions) and angular velocity ω (rad/s) of electric motor M1. Rotational angle sensor 25 may be dispensed with by configuring control apparatus 30 so that control apparatus 30 directly calculates rotational angle θ from the motor voltage or current.

Control apparatus 30 is configured in the form of an electronic control unit (ECU) and performs software processing of causing a CPU (not shown) to execute a program stored in advance and/or hardware processing by a dedicated electronic circuit so as to control the operation of electrically-powered vehicle 100.

A typical function of control apparatus 30 is to control the operations of converter 12 and inverter 14, based on torque command value Trqcom, voltage Vb detected by voltage sensor 10, current Ib detected by current sensor 11, system voltage VH detected by voltage sensor 13, motor currents iv, iw from current sensor 24, and rotational angle θ from rotational angle sensor 25, for example, so that electric motor M1 outputs a torque following torque command value Trqcom, in accordance with a control scheme described later herein. Specifically, control apparatus 30 generates control signals S1 to S8 for controlling converter 12 and inverter 14 and outputs these signals to converter 12 and inverter 14.

Control of electric motor M1 by control apparatus 30 will now be described in more detail.

Description of Control Modes

FIG. 2 is a diagram illustrating control modes for electric motor Ml shown in FIG. 1. Referring to FIG. 2, electrically-powered vehicle 100 uses a PWM control mode and a rectangular-wave voltage control mode in such a manner that switches the modes to each other, for controlling electric motor M1, specifically for electric power conversion in inverter 14.

The PWM control mode includes sine wave PWM control and overmodulation PWM control. In the case of the sine wave PWM control, in accordance with a voltage comparison between a sinusoidal voltage command and a carrier wave (typically a triangular wave), ON/OFF of the upper-lower arm's elements of each phase is controlled. Accordingly, the duty is controlled so that the fundamental component of a set of high-level periods corresponding to ON periods of the upper-arm element and low-level periods corresponding to ON periods of the lower-arm element is sinusoidal in a certain period. The sine wave PWM control which restricts the amplitude of the sinusoidal voltage command to not more than the amplitude of the carrier wave can only increase the fundamental component of the voltage applied to electric motor M1 (hereinafter also referred to simply as "motor applied voltage") to about 0.61 times as much as the input voltage. In the following, the ratio of the fundamental component (effective value) of the motor applied voltage (line voltage) to the input voltage to inverter 14 (namely system voltage VH) will be referred to as "modulation ratio."

In the case of the overmodulation PWM control, PWM control is performed similarly to the above-described sine wave PWM control with a range where the amplitude of the voltage command (sine wave component) is larger than the amplitude of the carrier wave. In particular, the voltage command can be distorted relative to the original sinusoidal waveform (amplitude correction) to thereby increase the fundamental wave component, and can increase the modulation ratio to a range from the maximum modulation ratio of the sine wave PWM control to 0.78. In the case of the overmodulation PWM control, the amplitude of the voltage command (sine wave component) is larger than the amplitude of the carrier wave, and therefore, the line voltage applied to electric motor M1 is not the sine wave but a voltage having a distorted waveform.

In contrast, the rectangular-wave voltage control applies, to the AC electric motor, one pulse of rectangular wave having a ratio of 1:1 between the high level period and the low level period, in the above-described certain period. Accordingly, the rectangular-wave voltage control increases the modulation ratio to 0.78.

In electric motor M1, an increase of the number of revolutions or the output torque is accompanied by an increase of the induced voltage, and accordingly the drive voltage to be required (motor's required voltage) increases. The voltage stepped-up by converter 12, namely system voltage VH, should be set higher than this motor's required voltage. System voltage VH, however, has a limit value (VH maximum voltage). Therefore, depending on the operating state of electric motor M1, the PWM control mode based on the sine wave PWM control or the overmodulation. PWM control, or the rectangular-wave voltage control mode is selectively applied. Under the rectangular-wave voltage control, the amplitude of the motor applied voltage is fixed. Therefore, the phase of the rectangular-wave voltage pulse is controlled based on a torque deviation from the torque command (torque deviation: difference between the value of the torque to be generated actually (estimated value) and the torque command value), so as to execute torque control.

FIG. 3 is a diagram illustrating a relationship between the operating state of the AC electric motor and the control modes shown in FIG. 2. Referring to FIG. 3, generally the sine wave PWM control is applied to a low rotational speed range R1, in order to reduce a torque variation, the overmodulation PWM control is applied to a middle rotational speed range R2, and the rectangular-wave voltage control is applied to a high rotational speed range R3. In particular, the overmodulation PWM control and the rectangular-wave voltage control are applied to improve the output of AC electric motor M1. Thus, which of the control modes shown in FIG. 2 is to be used is basically determined within the range of the available modulation ratio.

Configuration of Control Apparatus

Figure 4:
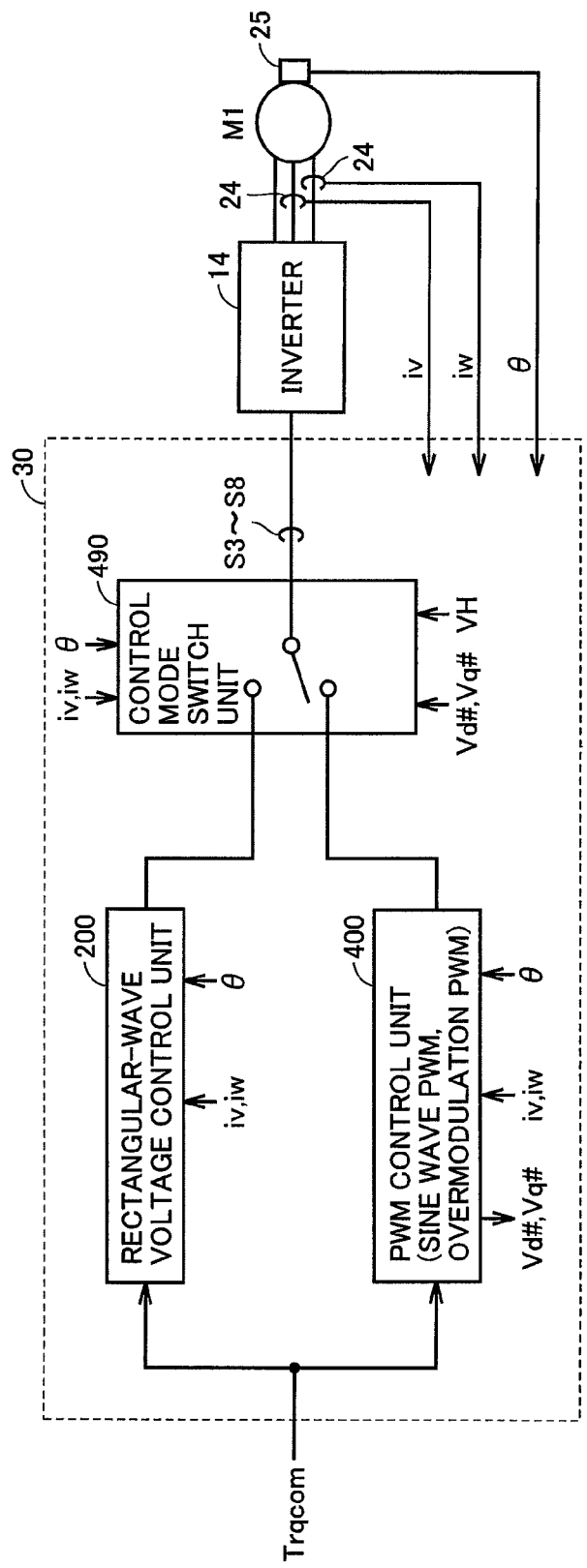
FIG. 4 is a functional block diagram illustrating, in terms of functions, a configuration of the control apparatus shown in FIG. 1.

FIG. 4 is a functional block diagram illustrating, in terms of functions, the configuration of control apparatus 30 shown in FIG. 1. Referring to FIG. 4, control apparatus 30 includes a rectangular-wave voltage control unit 200, a PWM control unit 400, and a control mode switch unit 490.

Rectangular-wave voltage control unit 200 receives torque command value Trqcom, motor currents iv, iw, and rotational angle θ. Based on these signals, rectangular-wave voltage control unit 200 sets the phase of the voltage to be applied to inverter 14 by means of torque feedback control, generates control signals S3 to S8 for driving inverter 14 based on the set phase of the voltage, and outputs the control signals to control mode switch unit 490.

PWM control unit 400 receives torque command value Trqcom, motor currents iv, iw detected by current sensor 24, and rotational angle θ detected by rotational angle sensor 25. Based on these signals, PWM control unit 400 generates voltage command values Vd#, Vq# to be applied to inverter 14 by means of electric current feedback control, generates control signals S3 to S8 for driving inverter 14 based on generated voltage command values Vd#, Vq#, and outputs the generated control signals to control mode switch unit 490. It is noted that, when the overmodulation PWM control is performed, the voltage amplitude is corrected and the fundamental component of the voltage command value is increased.

Control mode switch unit 490 receives voltage command values Vd#, Vq# from PWM control unit 400 and receives system voltage VH from voltage sensor 13 (FIG. 1). Based on the modulation ratio calculated from system voltage VH and voltage command values Vd#, Vq#, control mode switch unit 490 switches the PWM control mode to the rectangular-wave voltage control mode. Specifically, when the modulation ratio reaches 0.78, control mode switch unit 490 switches the PWM control mode to the rectangular-wave voltage control mode.

Since the modulation ratio of the rectangular-wave voltage control mode is constant, namely 0.78, switching of the rectangular-wave voltage control mode to the PWM control mode is done based on the phase of electric current. Control mode switch unit 490 receives motor currents iv, iw and rotational angle θ. Control mode switch unit 490 switches the rectangular-wave voltage control mode to the PWM control mode using these signals, based on the phase of electric current.

Configuration of Control Modes

Figure 5:
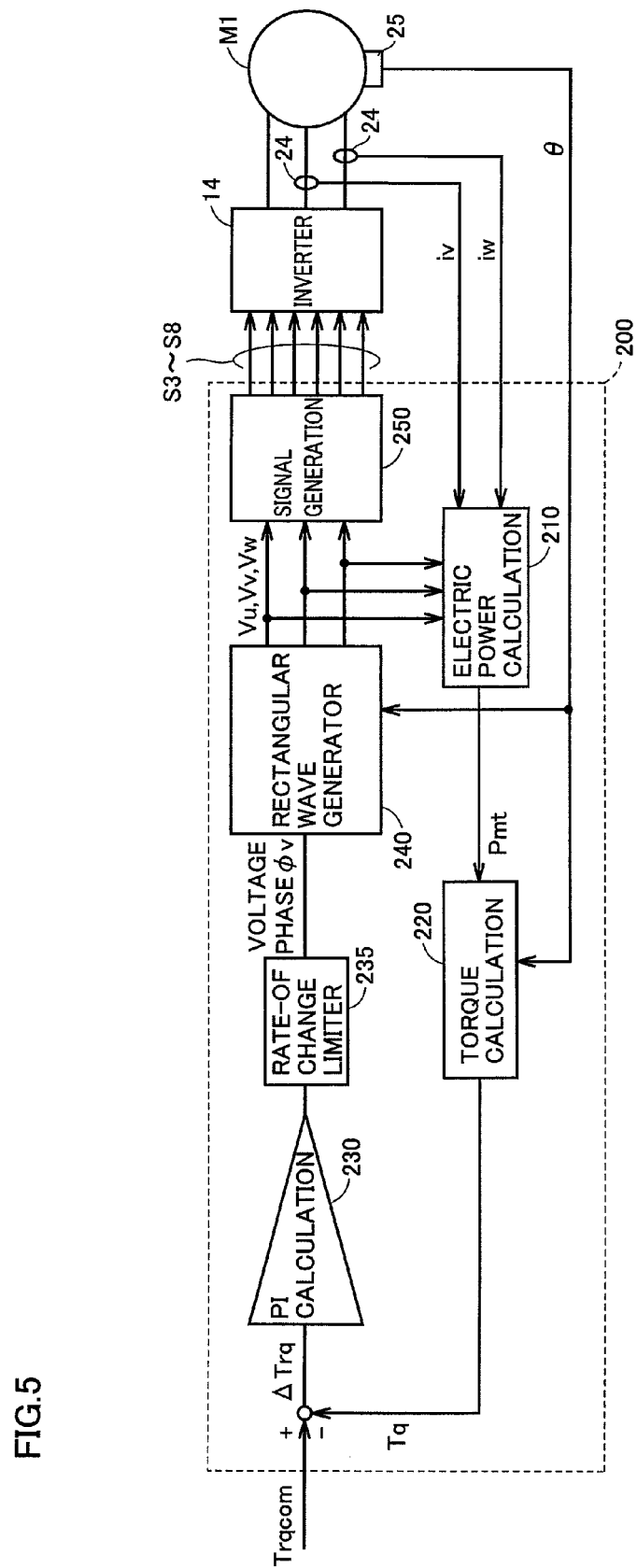
FIG. 5 is a functional block diagram illustrating, in terms of functions, a detailed configuration of a rectangular-wave voltage control unit shown in FIG. 4.

FIG. 5 is a functional block diagram illustrating, in terms of functions, a detailed configuration of rectangular-wave voltage control unit 200 shown in FIG. 4. Referring to FIG. 5, rectangular-wave voltage control unit 200 includes an electric power calculation unit 210, a torque calculation unit 220, a PI calculation unit 230, a rate-of-change limiter 235, a rectangular wave generator 240, and a signal generation unit 250.

Electric power calculation unit 210 calculates electric power (motor power) Pmt to be supplied to electric motor M1, using currents of respective phases determined from V phase current iv and W phase current iw detected by current sensor 24 as well as voltage command values Vu, Vv, Vw of respective phases (U phase, V phase, W phase), in accordance with a formula (1) below.

$$Pmt = iu \cdot Vu + iv \cdot Vv + iw \cdot Vw \tag{1}$$

Torque calculation unit 220 calculates estimated torque value Trq representing an actual torque, using motor power Pmt calculated by electric power calculation unit 210, and angular velocity ω calculated from rotational angle θ of electric motor M1 detected by rotational angle sensor 25, in accordance with a formula (2) below.

$$Trq=Pmt/\omega \quad (2)$$

PI calculation unit 230 calculates a control deviation by performing a PI (proportional integral) calculation on torque deviation ΔTrq relative to torque command value Trqcom (ΔTrq=Trqcom−Trq), and sets phase φv of the rectangular-wave voltage (hereinafter simply referred to as "voltage phase φv") in accordance with the control deviation. Specifically, in the case of a positive torque (Trqcom>0), PI calculation unit 230 advances voltage phase φv when the torque is deficient and retards voltage phase φv when the torque is excessive. In contrast, in the case of a negative torque (Trqcom<0), PI calculation unit 230 retards voltage phase φv when the torque is deficient and advances voltage phase φv when the torque is excessive.

Rate-of-change limiter 235 imposes a restriction on the rate of change of voltage phase φv. Specifically, under the rectangular-wave voltage control, in response to a change of the rotational speed of electric motor M1 due to disturbance such as skid, voltage phase φv is changed in order to maintain the torque. More specifically, in response to an increase of the rotational speed, voltage phase φv is advanced in order to maintain the torque and, in response to a decrease of the rotational speed, voltage phase φv is retarded. This change of voltage phase φv, however, causes offset to the three-phase motor current, and a higher rate of change of voltage phase φv causes a larger amount of offset. Since an increase of the amount of offset of the motor current ruins the stability of the rectangular-wave voltage control, rate-of-change limiter 235 is provided for restricting the rate of change of voltage phase φv.

Meanwhile, the restriction on the rate of change of voltage phase φv deteriorates the responsiveness of the control. In the case where the rotational speed of electric motor M1 abruptly changes due to skid or post-skid grip of drive wheel DW, it is desirable to give a higher priority to the responsiveness of the control (torque responsiveness). In particular, when post-skid grip occurs, low torque responsiveness causes a torque deviation that the actual output torque is excessively larger than the torque command, and therefore the torque responsiveness is required. Accordingly, the first embodiment lessens the restriction on the rate of change of rate-of-change limiter 235, in the case where the rotational speed of electric motor M1 abruptly changes.

Rectangular wave generator 240 generates voltage command values (rectangular wave pulses) Vu, Vv, Vw of respective phases in accordance with voltage phase φv. Signal generation unit 250 generates control signals S3 to S8 based on voltage command values Vu, Vv, Vw of respective phases. Accordingly, inverter 14 performs a switching operation based on control signals S3 to S8 to thereby apply a rectangular wave pulse in accordance with voltage phase φv, as each phase voltage for the motor.

Instead of electric power calculation unit 210 and torque calculation unit 220, a torque sensor may be arranged to determine torque deviation ΔTrq based on the value detected by the torque sensor.

Figure 6:
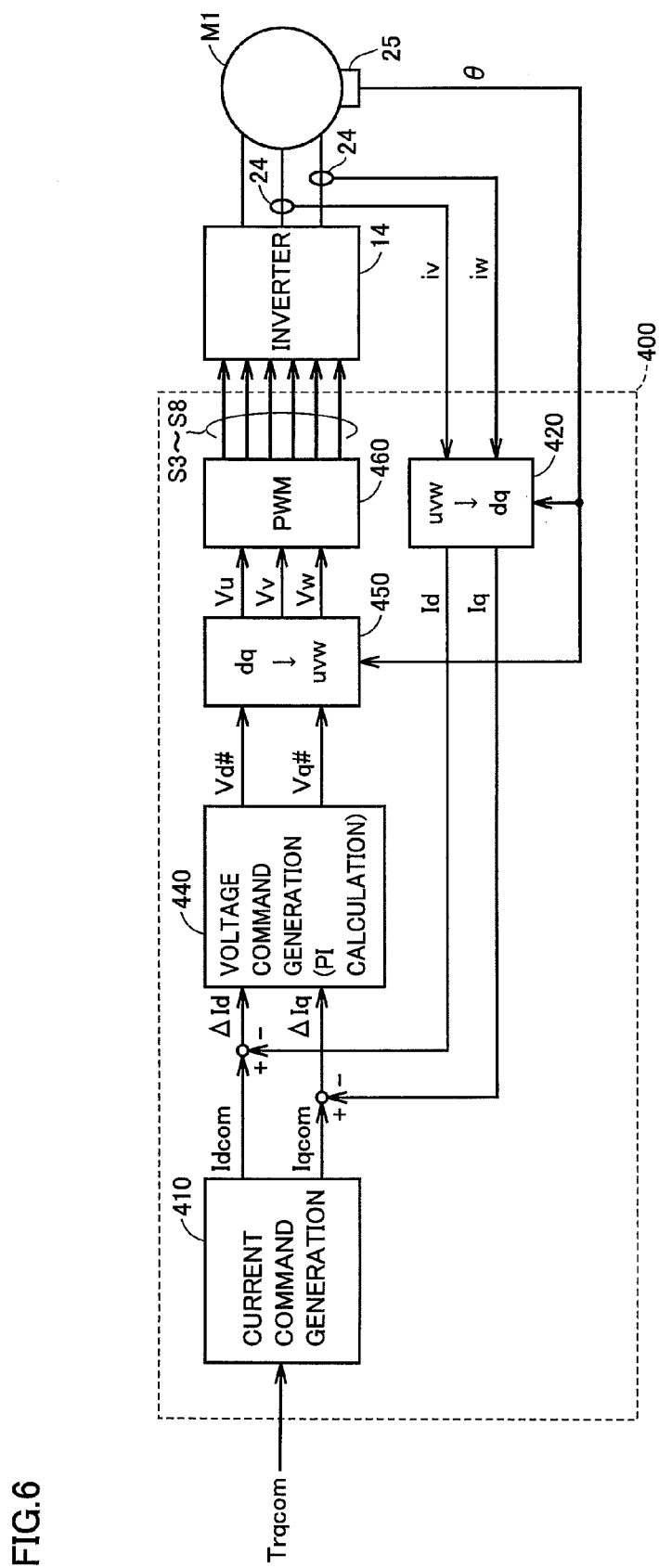
FIG. 6 is a functional block diagram illustrating, in terms of functions, a detailed configuration of a PWM control unit shown in FIG. 4.

FIG. 6 is a functional block diagram illustrating, in terms of functions, a detailed configuration of PWM control unit 400 shown in FIG. 4. Referring to FIG. 6, PWM control unit 400 includes a current command generation unit 410, coordinate transformation units 420, 450, a voltage command generation unit 440, and a PWM modulation unit 460.

Current command generation unit 410 generates d-axis current command value Idcom and q-axis current command value Iqcom corresponding to torque command value Trqcom for electric motor M1, based on a prepared map or the like. Coordinate transformation unit 420 performs coordinate transformation (from three phases of uvw to two phases of dq) using rotational angle θ of electric motor M1 to thereby convert V phase current iv and W phase current iw detected by current sensor 24 to d-axis current Id and q-axis current Iq.

Voltage command generation unit 440 performs a PI calculation on each of d-axis current deviation ΔId (ΔId=Idcom−Id) and q-axis current deviation ΔIq (ΔIq=Iqcom−Iq) to thereby calculate a control deviation, and generates d-axis voltage command value Vd# and q-axis voltage command value Vq# based on the control deviations.

Coordinate transformation unit 450 performs coordinate transformation (from two phases of dq to three phases of uvw) using rotational angle θ of electric motor M1 to thereby convert d-axis voltage command value Vd# and q-axis voltage command value Vq# to V phase, U phase, and W phase voltage command values Vu, Vv, Vw. PWM modulation unit 460 generates control signals S3 to S8 for driving inverter 14, based on a comparison between each phase voltage command value Vu, Vv, Vw with the carrier wave. The carrier wave is in the form of a triangular wave or sawtooth wave of a predetermined frequency.

Figure 7:
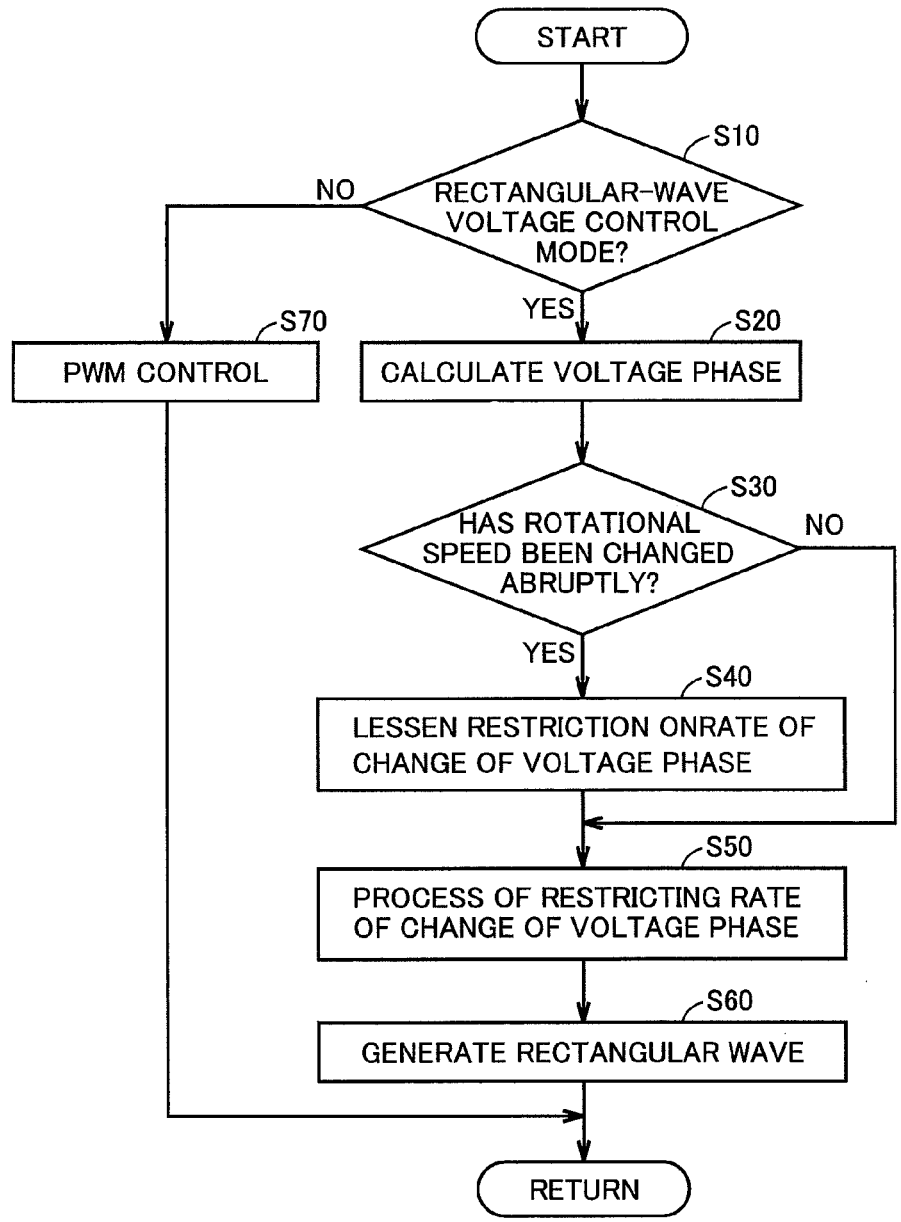
FIG. 7 is a flowchart regarding a process of restricting the rate of change of a voltage phase that is performed by the control apparatus shown in FIG. 1.

FIG. 7 is a flowchart regarding a process of restricting the rate of change of voltage phase φv that is performed by control apparatus 30 shown in FIG. 1. This process of the flowchart is performed by being called from a main routine at certain time intervals or each time a predetermined condition is satisfied.

Referring to FIG. 7, control apparatus 30 determines whether or not the control mode is the rectangular-wave voltage control mode (step S10). When control apparatus 30 determines that the control mode is the rectangular-wave voltage control mode (YES in step S10), control apparatus 30 performs a PI calculation on torque deviation ΔTrq relative to torque command value Trqcom to thereby calculate voltage phase φv of the rectangular-wave voltage (step S20).

Subsequently, control apparatus 30 determines whether or not the rotational speed of electric motor M1 has been changed abruptly (step S30). By way of example, a threshold value representing an abrupt change of the rotational speed of electric motor M1 is set in advance and, when the rate of change of the rotational speed exceeds this threshold value, it is determined that the rotational speed is changed abruptly.

Then, when control apparatus 30 determines that the rotational speed of electric motor M1 has been changed abruptly (YES in step S30), control apparatus 30 lessens the restriction on the rate of change of voltage phase φv (step S40). Specifically, control apparatus 30 sets an increased value which is larger than a normal limit value of rate-of-change limiter 235 (FIG. 5). The normal limit value and the increased value of rate-of-change limiter 235 are set in advance. When it is determined in step S30 that the rotational speed has not been changed abruptly (NO in step S30), step S40 is skipped and the flow proceeds to step S50.

Subsequently, control apparatus 30 performs a process of restricting the rate of change of voltage phase φv using rate-of-change limiter 235 (step S50). After the process of restricting the rate of change of voltage phase φv has been performed, control apparatus 30 generates voltage command values (rectangular-wave pulses) Vu, Vv, Vw of respective phases in accordance with voltage phase φv (step S60).

When control apparatus 30 determines in step S10 that the control mode is not the rectangular-wave voltage control mode (NO in step S10), control apparatus 30 performs the above-described PWM control (step S70).

As heretofore described, under the rectangular-wave voltage control of the first embodiment, rate-of-change limiter 235 imposes a restriction on the rate of change of voltage phase $\phi v$ of the rectangular-wave voltage. Accordingly, offset of the motor current is suppressed that occurs as the phase of the rectangular-wave voltage is changed in response to a change of the rotational speed of electric motor M1, and the stability of the electric motor control is enhanced. In contrast, when the rate of change of the rotational speed is larger than a predetermined value which represents an abrupt change of the rotational speed of electric motor M1, the restriction on the rate of change of voltage phase $\phi v$ is lessened. Thus, when an abrupt change occurs to the rotational speed of electric motor M1, priority is given to the capability of following the torque command and the responsiveness of the electric motor control is enhanced. As seen from the above, the first embodiment can achieve both the control stability and the torque responsiveness for the rectangular-wave voltage control for electric motor M1.

[Modification]

While the above-described first embodiment uses rate-of-change limiter 235 as a rate-of-change restriction unit for restricting the rate of change of voltage phase $\phi v$, a filter may alternatively be used as a rate-of-change restriction unit and the time constant of the filter may be changed so that the rate of change of voltage phase $\phi v$ can be changed (lessened).

Figure 8:
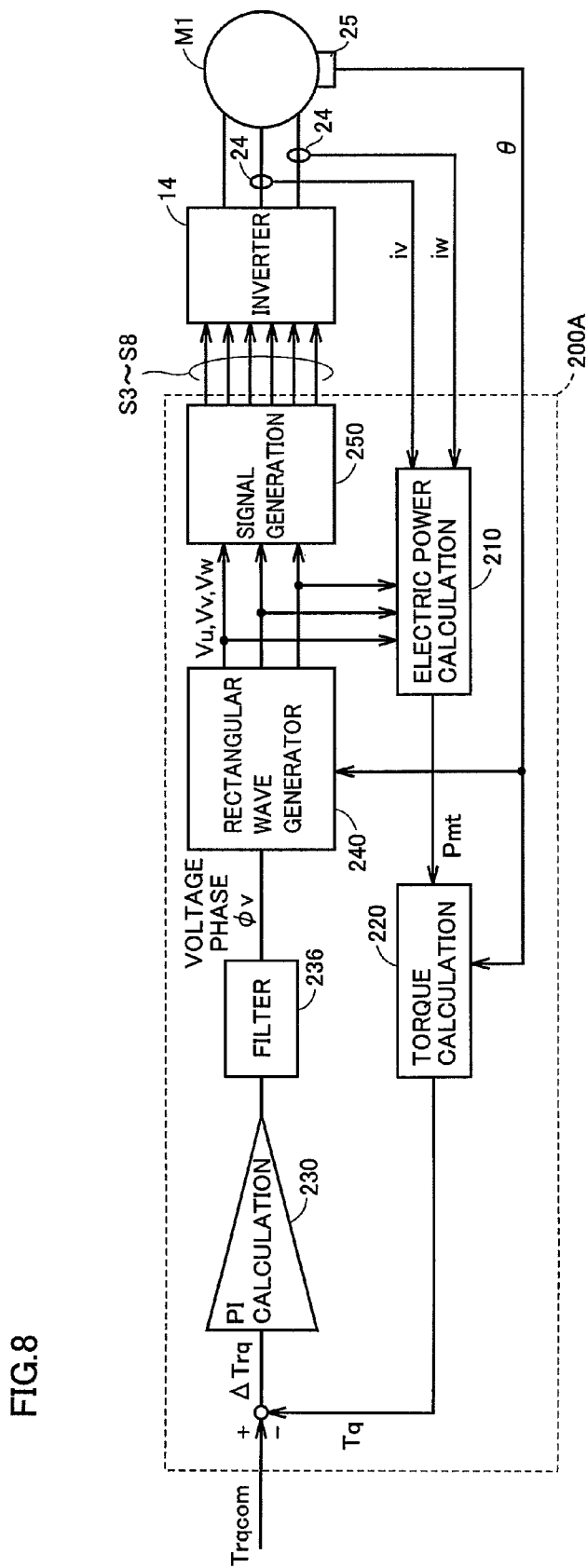
FIG. 8 is a functional block diagram illustrating, in terms of functions, a configuration of a rectangular-wave voltage control unit in a modification.

FIG. 8 is a functional block diagram illustrating, in terms of functions, a configuration of a rectangular-wave voltage control unit in this modification. Referring to FIG. 8, rectangular-wave voltage control unit 200A includes a filter 236 instead of rate-of-change limiter 235 in the configuration of rectangular-wave voltage control unit 200 in the first embodiment shown in FIG. 5.

Filter 236 is provided for restricting the rate of change of voltage phase $\phi v$, and configured in the form of a low-pass filter having a variable time constant for example. In the case where the rotational speed of electric motor M1 is changed abruptly, the time constant of filter 236 is decreased to lessen the filtering capability of filter 236 and accordingly lessen the restriction on the rate of change of voltage phase $\phi v$.

Other features of rectangular-wave voltage control unit 200A are identical to those of rectangular-wave voltage control unit 200 shown in FIG. 5.

Figure 9:
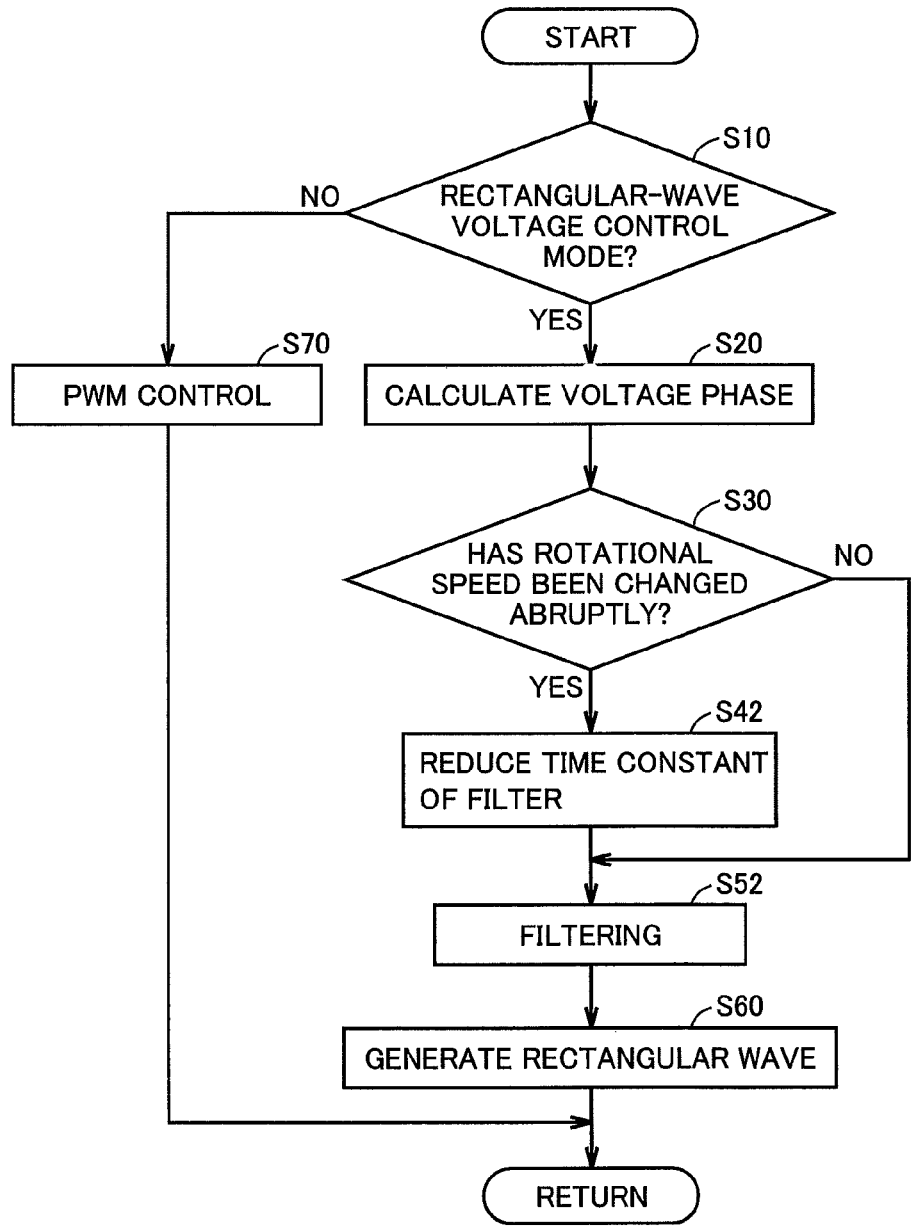
FIG. 9 is a flowchart regarding a process of restricting the rate of change of a voltage phase that is performed by a control apparatus in the modification.

FIG. 9 is a flowchart regarding a process of restricting the rate of change of voltage phase $\phi v$ that is performed by control apparatus 30 in this modification. This process of the flowchart is also performed by being called from a main routine at certain time intervals or each time a predetermined condition is satisfied.

Referring to FIG. 9, this flowchart includes steps S42 and S52 instead of steps S40 and S50 in the flowchart shown in FIG. 7. Specifically, when control apparatus 30 determines in step S30 that the rotational speed of electric motor M1 has been changed abruptly (YES in step S30), control apparatus 30 makes the time constant of filter 236 (FIG. 8) smaller than a normal time constant (step S42). The normal time constant and the time constant which is made smaller as described above of filter 236 are set in advance. When it is determined in step S30 that the rotational speed has not been changed abruptly (NO in step S30), step S42 is skipped and the flow proceeds to step S52.

Subsequently, control apparatus 30 performs a process of filtering voltage phase $\phi v$ using filter 236 (step S52). Accordingly, the rate of change of voltage phase $\phi v$ is restricted. After the process of filtering voltage phase $\phi v$ has been performed, the flow proceeds to step S60 in which voltage command values (rectangular wave pulses) Vu, Vv, Vw of respective phases are generated in accordance with voltage phase $\phi v$.

In this way, this modification can also achieve similar effects to those of the first embodiment.

[Second Embodiment]

In the case where an abrupt change occurs to the rotational speed of electric motor M1 due to disturbance such as skid or post-skid grip of drive wheel DW and the change of the rotational speed causes the rotational speed to increase, it is necessary to advance voltage phase $\phi v$ by the torque feedback control in order to maintain the torque. On the contrary, in the case where the change of the rotational speed causes the rotational speed to decrease, it is necessary to retard voltage phase $\phi v$ by the torque feedback control in order to maintain the torque.

Accordingly, in the present second embodiment, in the case where it is determined that the rotational speed of electric motor M1 has been changed abruptly and this change has caused the rotational speed to increase, only the restriction on the rate of change of advance shift of voltage phase $\phi v$ is lessened. In the case where it is determined that the rotational speed of electric motor M1 has been changed abruptly and this change has caused the rotational speed to decrease, only the restriction on the rate of change of retard shift of voltage phase $\phi v$ is lessened. In this way, unnecessary lessening of the restriction on the rate of change is eliminated and the stability of the control is ensured.

The overall configuration of electrically-powered vehicle 100 and control apparatus 30 of the second embodiment is identical to that of the first embodiment.

Figure 10:
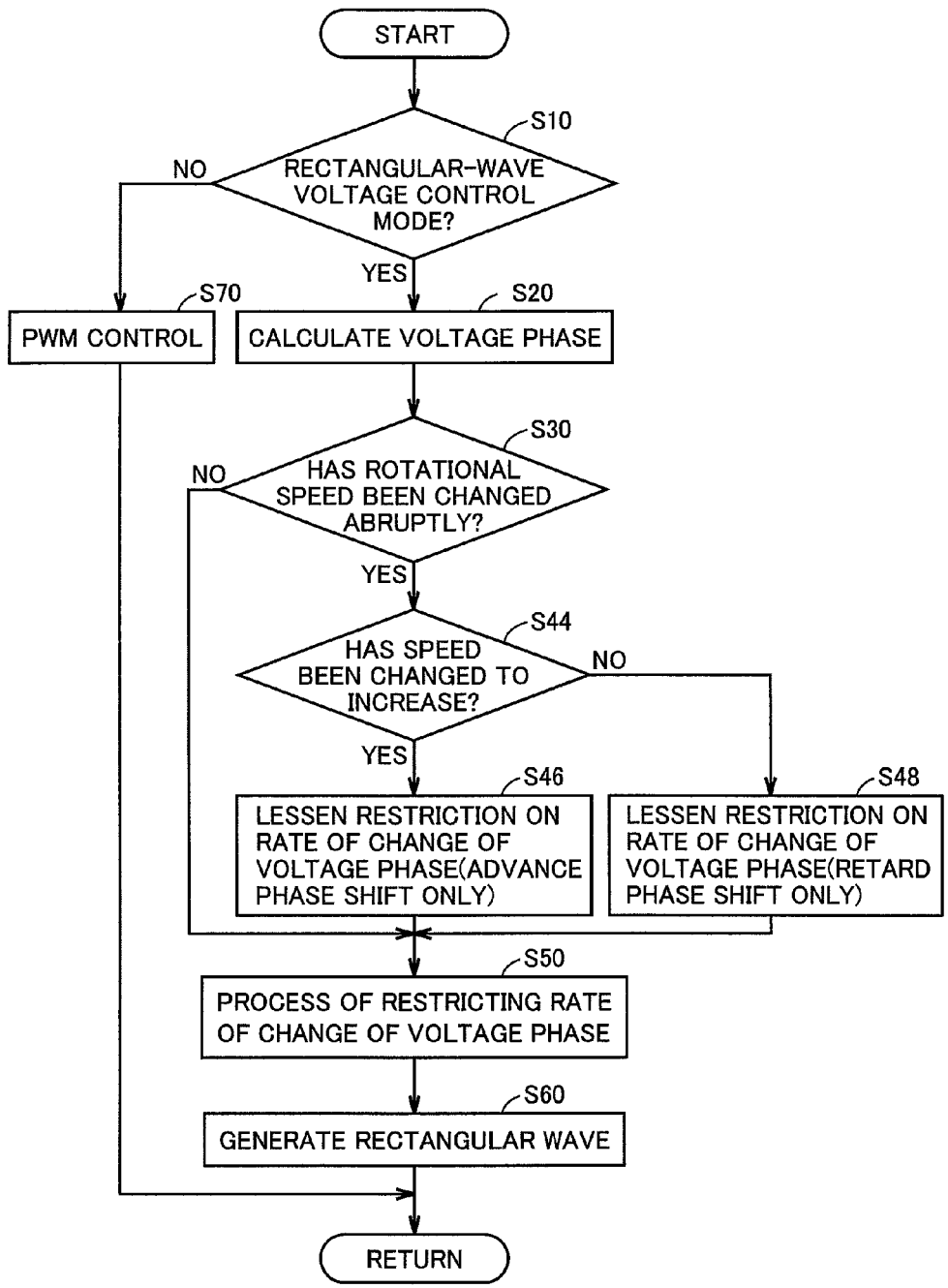
FIG. 10 is a flowchart regarding a process of restricting the rate of change of a voltage phase that is performed by a control apparatus in a second embodiment.

FIG. 10 is a flowchart regarding a process of restricting the rate of change of voltage phase $\phi v$ that is performed by control apparatus 30 in the second embodiment. This process of the flowchart is also performed by being called from a main routine at certain time intervals or each time a predetermined condition is satisfied.

Referring to FIG. 10, this flowchart includes steps S44, S46, and S48 instead of step S40 in the flowchart shown in FIG. 7. Specifically, when control apparatus 30 determines in step S30 that the rotational speed of electric motor M1 has been changed abruptly (YES in step S30), control apparatus 30 determines whether or not the abrupt change of the rotational speed has caused the rotational speed to increase (step S44). When control apparatus 30 determines that the change of the rotational speed has caused the rotational speed to increase (YES in step S44), control apparatus 30 lessens only the restriction on the rate of change of advance shift of voltage phase $\phi v$ (step S46). Namely, the restriction on the rate of change of retard shift of voltage phase $\phi v$ is not lessened.

In contrast, when control apparatus 30 determines in step S44 that the abrupt change of the rotational speed has caused the rotational speed to decrease (NO in step S44), control apparatus 30 lessens only the restriction on the rate of change of retard shift of voltage phase $\phi v$ (step S48). Namely, the restriction on the rate of change of advance shift of voltage phase $\phi v$ is not lessened.

After the process in step S46 or step S48 has been performed, the flow proceeds to step S50 in which the process of restricting the rate of change of voltage phase $\phi v$ is performed.

While the above description is given, based on the first embodiment, of the case where the rate of change of voltage phase $\phi v$ is restricted by rate-of-change limiter 235, the second embodiment is applicable as well to the case where the rate of change of voltage phase $\phi v$ is restricted by filter 236 (the modification of the first embodiment). Specifically, the time constant may be set separately for advance shift of voltage phase φv and retard shift of voltage phase φv. In the case where the change of the rotational speed causes the rotational speed to increase, the time constant may be set smaller than a normal time constant for only advance shift of voltage phase φv. In the case where the change of the rotational speed causes the rotational speed to decrease, the time constant may be set smaller for only retard shift of voltage phase φv.

As heretofore described, in the second embodiment, only the restriction on the rate of change of advance shift of voltage phase φv is lessened when the change of the rotational speed has caused the rotational speed to increase, while only the restriction on the rate of change of retard shift of voltage phase φv is lessened when the change of the rotational speed has caused the rotational speed to decrease. Lessening of the restriction on the rate of change is therefore kept minimum. Thus, according to the second embodiment, the stability of the rectangular-wave voltage control can be enhanced relative to the first embodiment.

[Third Embodiment]

In the above-described embodiments each, the restriction on the rate of change of voltage phase φv is lessened in the case where the rotational speed of electric motor M1 is changed abruptly. In the present third embodiment, the restriction on the rate of change of voltage phase φv is lessened in the case where the torque command for electric motor M1 is changed abruptly. Accordingly, the torque responsiveness when an abrupt change occurs to the torque command can be enhanced.

The overall configuration of electrically-powered vehicle 100 and control apparatus 30 of the third embodiment is identical to that of the first embodiment.

Figure 11:
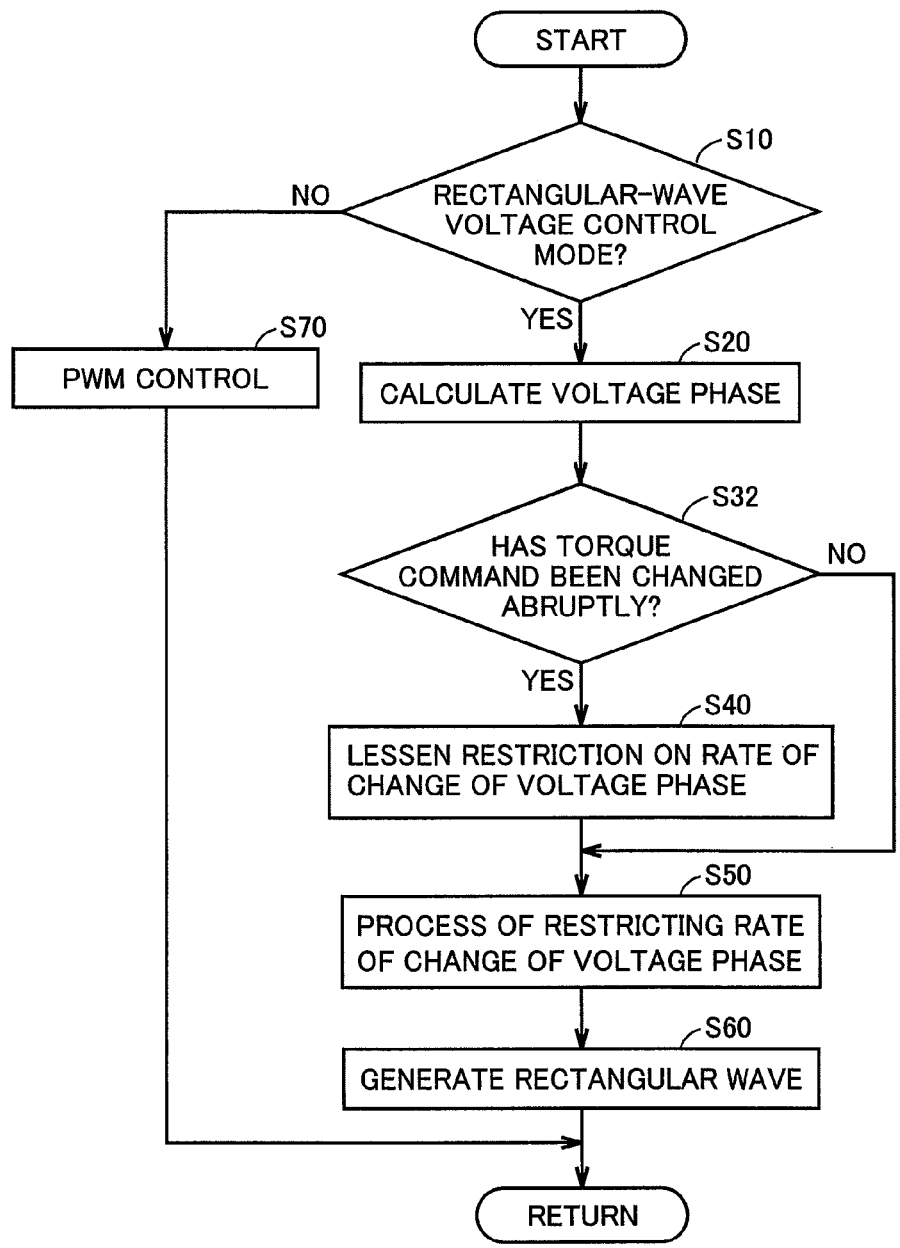
FIG. 11 is a flowchart regarding a process of restricting the rate of change of a voltage phase that is performed by a control apparatus in a third embodiment.

FIG. 11 is a flowchart regarding a process of restricting the rate of change of voltage phase φv that is performed by control apparatus 30 in the third embodiment.

This process of the flowchart is also performed by being called from a main routine at certain time intervals or each time a predetermined condition is satisfied.

Referring to FIG. 11, this flowchart includes step S32 instead of step S30 in the flowchart shown in FIG. 7. Specifically, after voltage phase φv of the rectangular-wave voltage is calculated in step S20, control apparatus 30 determines whether or not the torque command for electric motor M1 has been changed abruptly (step S32). By way of example, a threshold value representing an abrupt change of torque command value Trqcom for electric motor M1 is set in advance and, when the rate of change of torque command value Trqcom exceeds the threshold value, it is determined that an abrupt change occurs to the torque command.

When it is determined that the torque command for electric motor M1 has been changed abruptly (YES in step S32), the flow proceeds to step S40 in which the restriction on the rate of change of voltage phase φv is lessened. In contrast, when it is determined in step S32 that the torque command has not been changed abruptly (NO in step S32), step S40 is skipped and the flow proceeds to the process in step S50.

While the above description is given, based on the first embodiment, of the case where the rate of change of voltage phase φv is restricted by rate-of-change limiter 235, the third embodiment is applicable as well to the case where the rate of change of voltage phase φv is restricted by filter 236 (the modification of the first embodiment). Specifically, the time constant of filter 236 may be set smaller than a normal time constant when the torque command abruptly changes.

Furthermore, like the second embodiment, in the case where an abrupt change occurs to the torque command for electric motor M1 and the abrupt change of the torque command causes the torque command to increase, only the restriction on the rate of change of advance shift of voltage phase φv may be lessened. In the case where the abrupt change of the torque command causes the torque command to decrease, only the restriction on the rate of change of retard shift of voltage phase φv may be lessened.

Moreover, the above-described first and second embodiments (including the modification) may be combined with the third embodiment, so that the restriction on the rate of change of voltage phase φv is lessened in the case where the rotational speed of electric motor M1 or the torque command for electric motor M1 is changed abruptly.

As heretofore described, the third embodiment can also achieve both the control stability and the torque responsiveness for the rectangular-wave voltage control for electric motor M1.

In the above-described embodiments each, skid or grip of drive wheel DW may be detected based on the detected value of the rotational speed (the number of revolutions) of drive wheel DW or rotational angle θ of electric motor M1, and whether or not an abrupt change has occurred to electric motor M1 may be determined based on whether or not skid or post-skid grip has occurred to drive wheel DW. In the second embodiment, whether or not an abrupt change of the rotational speed of electric motor M1 has caused the rotational speed to increase may be determined based on whether or not skid has occurred to drive wheel DW.

The present invention is applicable to a variety of vehicles having the basic configuration of electrically-powered vehicle 100 shown in FIG. 1. For example, the present invention is also applicable to a hybrid vehicle mounted further with an engine, in addition to the components shown in FIG. 1, a fuel cell vehicle mounted with a fuel cell functioning as a DC power source in addition to power storage device B, and the like.

In the description above, PI calculation unit 230 corresponds to an embodiment of "voltage command generation unit" of the present invention, and rate-of-change limiter 235 and filter 236 each correspond to an embodiment of "rate-of-change restriction unit" of the present invention.

It should be construed that the embodiments disclosed herein are by way of illustration in all respects, not by way of limitation. It is intended that the scope of the present invention is defined by claims, not by the above description of the embodiments, and encompasses all modifications and variations equivalent in meaning and scope to the claims.

REFERENCE SIGNS LIST 5-7 electric power line; 10, 13 voltage sensor; 10# DC voltage generation unit; 11, 24 current sensor; 12 converter; 14 inverter; 15 U phase upper-lower arm; 16 V phase upper-lower arm; 17 W phase upper-lower arm; 25 rotational angle sensor; 30 control apparatus; 100 electrically-powered vehicle; 200, 200A rectangular-wave voltage control unit; 210 electric power calculation unit; 220 torque calculation unit; 230 PI calculation unit; 235 rate-of-change limiter; 236 filter; 240 rectangular-wave generator; 250 signal generation unit; 400 PWM control unit; 410 current command generation unit; 420, 450 coordinate transformation unit; 440 voltage command generation unit; 460 PWM modulation unit; 490 control mode switch unit; B power storage device; SR1, SR2 system relay; C0, C1 smoothing capacitor; Q1-Q8 switching element; D1-D8 diode; L1 reactor; M1 electric motor; DW drive wheel

The invention claimed is:

1. A control apparatus for an electric motor comprising:
a voltage command generation unit for generating a rectangular-wave voltage command that is phase-controlled in accordance with a torque command to cause the electric motor to operate; and
a rate-of-change restriction unit for imposing a restriction on a rate of change of said rectangular-wave voltage command,
said rate-of-change restriction unit lessening the restriction on the rate of change of said rectangular-wave voltage command, when a rate of change of a rotational speed of said electric motor is larger than a predetermined value representing an abrupt change of the rotational speed of said electric motor.

2. The control apparatus for an electric motor according to claim 1, wherein
when the change of the rotational speed of said electric motor causes the rotational speed to increase, said rate-of-change restriction unit lessens said restriction on only advance phase shift of said rectangular-wave voltage command, and
when the change of the rotational speed of said electric motor causes the rotational speed to decrease, said rate-of-change restriction unit lessens said restriction on only retard phase shift of said rectangular-wave voltage command.

3. The control apparatus for an electric motor according to claim 1, wherein
said rate-of-change restriction unit further lessens said restriction, when a rate of change of said torque command is larger than another predetermined value representing an abrupt change of said torque command.

4. An electrically-powered vehicle comprising:
a control apparatus for an electric motor as recited in claim 1;
the electric motor controlled by said control apparatus; and
a drive wheel driven by said electric motor.

5. The electrically-powered vehicle according to claim 4, wherein
when skid of said drive wheel or grip of said drive wheel after said skid is detected, the rate-of-change restriction unit of said control apparatus lessens the restriction on the rate of change of said rectangular-wave voltage command.

6. The electrically-powered vehicle according to claim 5, wherein
when said skid is detected, said rate-of-change restriction unit lessens said restriction on only advance phase shift of said rectangular-wave voltage command, and
when said grip is detected, said rate-of-change restriction unit lessens said restriction on only retard phase shift of said rectangular-wave voltage command.

7. The electrically-powered vehicle according to claim 4, wherein
said rate-of-change restriction unit further lessens said restriction, when a rate of change of said torque command is larger than another predetermined value representing an abrupt change of said torque command.

8. A method for controlling an electric motor, comprising the steps of:
generating a rectangular-wave voltage command that is phase-controlled in accordance with a torque command to cause the electric motor to operate;
imposing a restriction on a rate of change of said rectangular-wave voltage command; and
lessening the restriction on the rate of change of said rectangular-wave voltage command, when a rate of change of a rotational speed of said electric motor is larger than a predetermined value representing an abrupt change of the rotational speed of said electric motor.

9. The method for controlling an electric motor according to claim 8, wherein
said step of lessening the restriction on the rate of change includes the steps of:
lessening said restriction on only advance phase shift of said rectangular-wave voltage command when the change of the rotational speed of said electric motor causes the rotational speed to increase, and
lessening said restriction on only retard phase shift of said rectangular-wave voltage command when the change of the rotational speed of said electric motor causes the rotational speed to decrease.

10. The method for controlling an electric motor according to claim 8, wherein
said step of lessening the restriction on the rate of change includes the step of lessening said restriction, when a rate of change of said torque command is larger than another predetermined value representing an abrupt change of said torque command.

11. An electrically-powered vehicle comprising:
a control apparatus for an electric motor as recited in claim 2;
the electric motor controlled by said control apparatus; and
a drive wheel driven by said electric motor.

12. An electrically-powered vehicle comprising:
a control apparatus for an electric motor as recited in claim 3;
the electric motor controlled by said control apparatus; and
a drive wheel driven by said electric motor.

13. The electrically-powered vehicle according to claim 11, wherein
when skid of said drive wheel or grip of said drive wheel after said skid is detected, the rate-of-change restriction unit of said control apparatus lessens the restriction on the rate of change of said rectangular-wave voltage command.

14. The electrically-powered vehicle according to claim 12, wherein
when skid of said drive wheel or grip of said drive wheel after said skid is detected, the rate-of-change restriction unit of said control apparatus lessens the restriction on the rate of change of said rectangular-wave voltage command.

15. The electrically-powered vehicle according to claim 13, wherein
when said skid is detected, said rate-of-change restriction unit lessens said restriction on only advance phase shift of said rectangular-wave voltage command, and
when said grip is detected, said rate-of-change restriction unit lessens said restriction on only retard phase shift of said rectangular-wave voltage command.

16. The electrically-powered vehicle according to claim 14, wherein
when said skid is detected, said rate-of-change restriction unit lessens said restriction on only advance phase shift of said rectangular-wave voltage command, and
when said grip is detected, said rate-of-change restriction unit lessens said restriction on only retard phase shift of said rectangular-wave voltage command.

17. The electrically-powered vehicle according to claim 11, wherein
said rate-of-change restriction unit further lessens said restriction, when a rate of change of said torque command is larger than another predetermined value representing an abrupt change of said torque command.

18. The electrically-powered vehicle according to claim 12, wherein
said rate-of-change restriction unit further lessens said restriction, when a rate of change of said torque command is larger than another predetermined value representing an abrupt change of said torque command.

* * * * *